(12) United States Patent
Paczkowski et al.

(10) Patent No.: US 11,755,741 B2
(45) Date of Patent: *Sep. 12, 2023

(54) TRUSTED BOOT-LOADER AUTHENTICATION

(71) Applicant: T-Mobile Innovations LLC, Overland Park, KS (US)

(72) Inventors: Lyle W. Paczkowski, Mission Hills, KS (US); William M. Parsel, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,159

(22) Filed: Jun. 22, 2022

(65) Prior Publication Data

US 2022/0318393 A1    Oct. 6, 2022

Related U.S. Application Data

(63) Continuation of application No. 16/581,126, filed on Sep. 24, 2019, now Pat. No. 11,416,619.

(51) Int. Cl.
| | |
|---|---|
| *H04L 29/00* | (2006.01) |
| *G06F 21/57* | (2013.01) |
| *G06F 11/10* | (2006.01) |
| *G06F 21/44* | (2013.01) |

(52) U.S. Cl.
CPC ........ *G06F 21/575* (2013.01); *G06F 11/1004* (2013.01); *G06F 21/44* (2013.01)

(58) Field of Classification Search
CPC .... G06F 21/575; G06F 11/1004; G06F 21/44; G06F 21/725; G06F 2221/2149
See application file for complete search history.

(56) References Cited

U.S. PATENT DOCUMENTS

| | | | |
|---|---|---|---|
| 9,282,898 B2 | 3/2016 | McRoberts et al. | |
| 11,416,619 B1 | 8/2022 | Paczkowski et al. | |
| 2016/0247144 A1 | 8/2016 | Oh et al. | |
| 2017/0083882 A1 | 3/2017 | Kim et al. | |
| 2017/0264607 A1* | 9/2017 | Surdu | H04W 12/086 |
| 2017/0344407 A1* | 11/2017 | Jeon | G06F 21/74 |
| 2018/0341937 A1 | 11/2018 | Kim et al. | |
| 2019/0005229 A1 | 1/2019 | Hlaing et al. | |

OTHER PUBLICATIONS

Office Action dated Dec. 14, 2021 U.S. Appl. No. 16/581,126, filed Sep. 24, 2019.
Notice of Allowance dated Apr. 6, 2022 U.S. Appl. No. 16/581,126, filed Sep. 24, 2019.

\* cited by examiner

*Primary Examiner* — Ghazal B Shehni

(57) ABSTRACT

A method of boot-loading an electronic device. The method comprises boot-loading a trusted execution environment (TEE) in a trusted security zone of a processor of the electronic device, where the TEE boot-loads before a rich execution environment (REE) boot-loads, launching a boot-loader authentication application by the TEE in the trusted security zone, determining a signature value of an REE boot-loader by the boot-loader authentication application over the instructions of the REE boot-loader, comparing the signature value of the REE boot-loader to an authentication signature value stored in the TEE, and, in response to the signature value of the REE boot-loader not matching the authentication signature value, taking action by the boot-loader authentication application.

20 Claims, 4 Drawing Sheets

TRUSTED BOOT-LOADER AUTHENTICATION

CROSS-REFERENCE TO RELATED APPLICATIONS

This application is a continuation of and claims priority under 35 U.S.C. § 120 to U.S. patent application Ser. No. 16/581,126 filed on Sep. 24, 2019, entitled "Trusted Boot-Loader Authentication" by Lyle W. Paczkowski, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Boot-loaders may take a variety of different forms. A boot-loader may be the first logic or program instructions that are executed when an electronic processor powers on and may, for example, execute before any applications are executed and before an operating system (OS) is running. The first instruction of the boot-loader may be stored at a physical location in memory from which the processor is designed and manufactured (e.g., "hard wired") to load its first executable instruction. The processor may execute each of the boot-loader instructions located in memory in sequence, unless an instruction commands the processor to load the next instruction from a different address—an address different from the next sequential address. An instruction that commands the processor to load the next instruction from a different address than the next sequential address may be called a branch instruction or a jump instruction. The boot-loader typically loads configuration settings into processor registers or other memory that will determine some of the operation of the processor and/or the OS. The boot-loader typically loads some kind of OS from non-transitory memory to transitory memory—for example to cache memory within the processor itself or into fast random access memory (RAM) coupled to the processor. After the boot-loader has completed its operations, it may instruct the processor to execute its next instruction from an address where the boot-loader has loaded the first instruction of the OS. The OS may then begin running and takes things over from there. The boot-loader can be imagined to build the execution environment of the processor from an initial inert or dormant state, first to a crawling state, next to a walking state, and then to a running state.

SUMMARY

In an embodiment, a method of boot-loading an electronic device is disclosed. The method comprises boot-loading a trusted execution environment (TEE) in a trusted security zone of a processor of the electronic device, where the TEE boot-loads before a rich execution environment (REE) boot-loads and launching a boot-loader authentication application by the TEE in the trusted security zone. The method further comprises determining a signature value of an REE boot-loader by the boot-loader authentication application over the instructions of the REE boot-loader and comparing the signature value of the REE boot-loader by the boot-loader authentication application to a first authentication signature value stored in the TEE. The method further comprises determining a signature value of an operating system (OS) of the REE by the boot-loader authentication application over the instructions and data files of the OS, comparing the signature value of the OS of the REE by the boot-loader authentication application to a second authentication signature value stored in the TEE, and, in response to the signature value of the REE boot-loader not matching the first authentication signature value or the signature value of the OS of the REE not matching the second authentication signature value, taking action by the boot-loader authentication application.

In another embodiment, an electronic device is disclosed. The electronic device comprises a processor comprising a trusted execution environment (TEE) and a rich execution environment (REE), a non-transitory memory, an REE boot-loader stored in an REE portion of the non-transitory memory, and a boot-loader authentication application stored in a TEE portion of the non-transitory memory. When executed in the REE of the processor, the REE boot-loader boot-loads the REE. When executed in the TEE of the processor, the boot-loader authentication application determines a signature value of the REE boot-loader, compares the signature value of the REE boot-loader to an authentication signature value stored in the TEE portion of the non-transitory memory, and, in response to the signature value of the REE boot-loader not matching the authentication signature value, takes action.

In yet another embodiment, another method of boot-loading an electronic device is disclosed. The method comprises boot-loading a trusted execution environment (TEE) in a trusted security zone of a processor of the electronic device, where the TEE boot-loads before a rich execution environment (REE) boot-loads and launching a boot-loader authentication application by the TEE in the trusted security zone. The method further comprises determining a signature value of an REE boot-loader by the boot-loader authentication application over the instructions of the REE boot-loader, comparing the signature value of the REE boot-loader to an authentication signature value stored in the TEE, and, in response to the signature value of the REE boot-loader not matching the authentication signature value, taking action by the boot-loader authentication application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
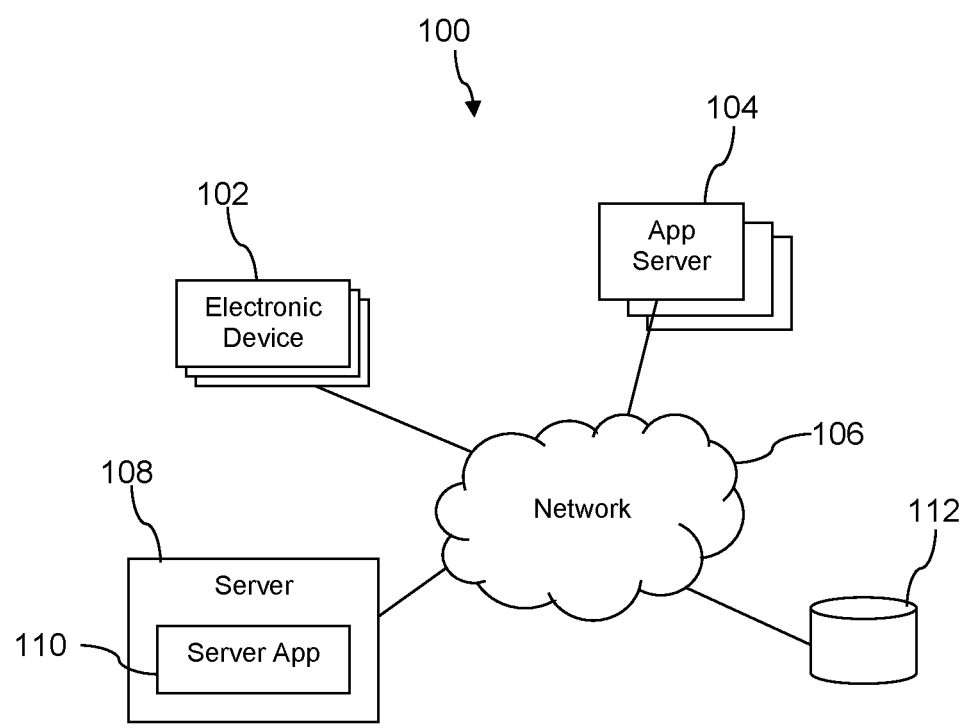
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The Internet of things (IoT) is projected to be a strong technology growth area in the future. One of the challenges of an IoT build-out, however, is electronic security. How is security provided to prevent various forms of electronic fraud? One hacking strategy is to root the IoT device—to hack into the device and alter the operating system (OS) in some way to commit identity theft, for example to access communication services to which the IoT device is not authorized to access. The present disclosure teaches a trusted boot-loader authentication application that performs boot-loader and OS authentication procedures in a trusted execution environment TEE and takes appropriate action if the boot-loader or OS do not pass authentication. While the description herein may use the example of an IoT device, it is understood that the teachings of the present disclosure may be advantageously applied in other electronic devices that are not IoT devices.

In an embodiment, an IoT device comprises a processor that provides hardware support for a trusted execution environment (TEE). The processor also provides for conventional processing in what may be referred to as a rich execution environment (REE). When the processor executes in the TEE, conventional applications are not permitted to execute on the processor, whereby to prevent conventional applications from eavesdropping on TEE processing and from interfering with and/or corrupting trusted applications. Further details on TEE and trusted processing are provided hereinafter. When the processor goes through a power-on boot, the TEE is booted first and the REE remains dormant and unloaded.

After the TEE has booted but before the REE has booted (e.g., before the REE boot-loader application has executed and before the REE OS is loaded), the TEE launches the boot-loader authentication application. The boot-loader authentication application accesses the REE boot-loader instructions in non-transitory memory of the IoT and analyzes them. In an embodiment, the boot-loader authentication application reads each instruction of the REE boot-loader one at a time, generating a hash of the instructions as it sequentially reads all the instructions. At the completion of this process, the boot-loader authentication application has generated a hash value that is quasi-unique and that represents the instructions of the REE boot-loader. If the REE boot-loader is altered in anyway, the hash value determined in this process by the boot-loader authentication application would be different. The boot-loader authentication application compares the completed hash value to an authentication value stored in a TEE portion of non-volatile memory (e.g., a portion of memory that is inaccessible to the REE). If the hash value generated by the boot-loader authentication application matches the stored authentication value, the REE boot-loader is deemed secure an uncorrupted.

If, however the hash value generated by the boot-loader authentication application does not match the stored authentication value, the REE boot-loader has detected that the REE boot-loader has been changed in some way and takes appropriate action. Appropriate action may involve preventing the REE boot-loader from executing. Appropriate action may involve allowing the REE boot-loader and OS to execute but then overwriting configuration values installed in the transitory memory of the IoT device (for example, overwrite an international mobile subscriber identity (IMSI) and/or an electronic serial number (ESN) and/or other identifying information in the transitory memory). Appropriate action may involve reflashing the REE boot-loader and/or OS of the IoT device. Appropriate action may involve allowing the REE boot-loader and OS to execute but sending a message describing the failed authentication process to a communication access domain, an operator domain, and/or a service domain.

In an embodiment, the boot-loader authentication application may be commanded to execute by a server application that monitors IoT devices. The server application may randomly select a portion of IoT devices that it monitors to perform boot-load authentication on a periodic basis. For example, every day the server application may command 1% of the IoT devices it monitors to perform boot-load authentication and report results back to the server application. It is noted that boot-load authentication can still be executed when the IoT device is fully booted and the REE is executing, because the boot-loader authentication application can still read the REE boot-loader instructions and still read the OS instructions and data in non-transitory memory. In an embodiment, however, when the server application commands the IoT device to perform boot-loader authentication, the REE is shut down, the boot-loader authentication executes in the TEE, and then the REE is rebooted.

If the server application determines that an excessive number of IoT devices are failing boot-loader authentication it can increase the frequency of commanding execution of the boot-loader authentication application. In an embodiment, if the server application determines that an excessive number of IoT devices are failing boot-loader authentication in a delimited population of all IoT devices—for example in the delimited population of IoT devices located in one specific state or territory of the United States—the server application can command more frequent boot-loader authentication among IoT devices belonging to that delimited population of IoT devices and command less frequent boot-loader authentication among IoT devices that do not belong to that delimited population of IoT devices.

The boot-loader authentication application taught herein can increase the security of the IoT environment and promote the more rapid build-out of that IoT environment, because IoT stake holders will be able to operate with less exposure to hacking of the IoT devices.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of nontrusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. A plurality of different embedded hardware technologies already provide support for a TEE including AMD, ARM, Intel, and RISC-V, and other technology vendors are expected to follow the lead of these innovators in the future. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credentials and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, system 100 comprises a plurality of electronic devices 102, a plurality of application servers 104, a network 106, a boot-loader authentication server 108 that executes a boot-loader authentication server application 110, and a data store 112. An electronic device 102 may communicate via the network 106 to one of the application servers 104. The electronic device 102 may receive communications from the application server 104, for example commands. The electronic device 102 may send communications to the application server 104, for example data uploads. A first electronic device 102 may communicate with a first application server 104, and a second electronic device 102 may communicate with a second application server 104, where the second application server 104 is different from the first application server 104. The network 106 may comprise one or more private networks, one or more public networks, or a combination thereof. The electronic device 102 may be an Internet of things (IoT) device. The electronic device 102 may be a mobile phone, a smart phone, a wearable computer, a laptop computer, a tablet computer, or a notebook computer. A first electronic device 102 may be an IoT device, a second electronic device 102 may be a smart phone, a third electronic device 102 may be a laptop computer, a fourth electronic device 102 may be a wearable computer. In an embodiment, the system 100 comprises any number of electronic devices 102 and any number of application servers 104.

The electronic devices 102 may comprise a boot-loader authentication application that executes in a trusted execution environment TEE of the electronic device 102 to authenticate a boot-loader of the electronic device 102 and optionally to authenticate at least a portion of an operating system (OS) of the electronic device 102, for example to authenticate a kernel portion of the OS of the electronic device 102. The boot-loader authentication application may execute when the electronic device 102 powers-on. In an embodiment, the boot-loader authentication server application 110 that executes on the boot-loader authentication server 108 may command the boot-loader authentication application on one or more of the electronic devices 102 to execute. In an embodiment, the boot-loader authentication server application 110 may select a fraction of the electronic devices 102 deployed in the system 100 to command to execute their boot-loader authentication applications, for example 1/100th of the electronic devices 102. In an embodiment, the boot-loader authentication server application 110 periodically commands each of the electronic devices 102 to execute their boot-loader authentication applications, for example, 1 percent of the electronic devices 102 each day for 100 days. The identity and/or communication addresses of the electronic devices 102 may be stored in the data store 112, and the boot-loader authentication server application 110 may read the identities and/or communication addresses of the electronic devices 102 from the data store 112.

The boot-loader authentication server application 110 may determine or be informed that a delimited portion of the electronic devices 102 are at increased risk of having been rooted or otherwise subverted by malware. The boot-loader authentication server application 110, in this case, may command the boot-loader authentication applications in electronic devices 102 in the delimited portion of the electronic devices 102 at increased risk to execute at an increased periodic frequency.

Figure 2:
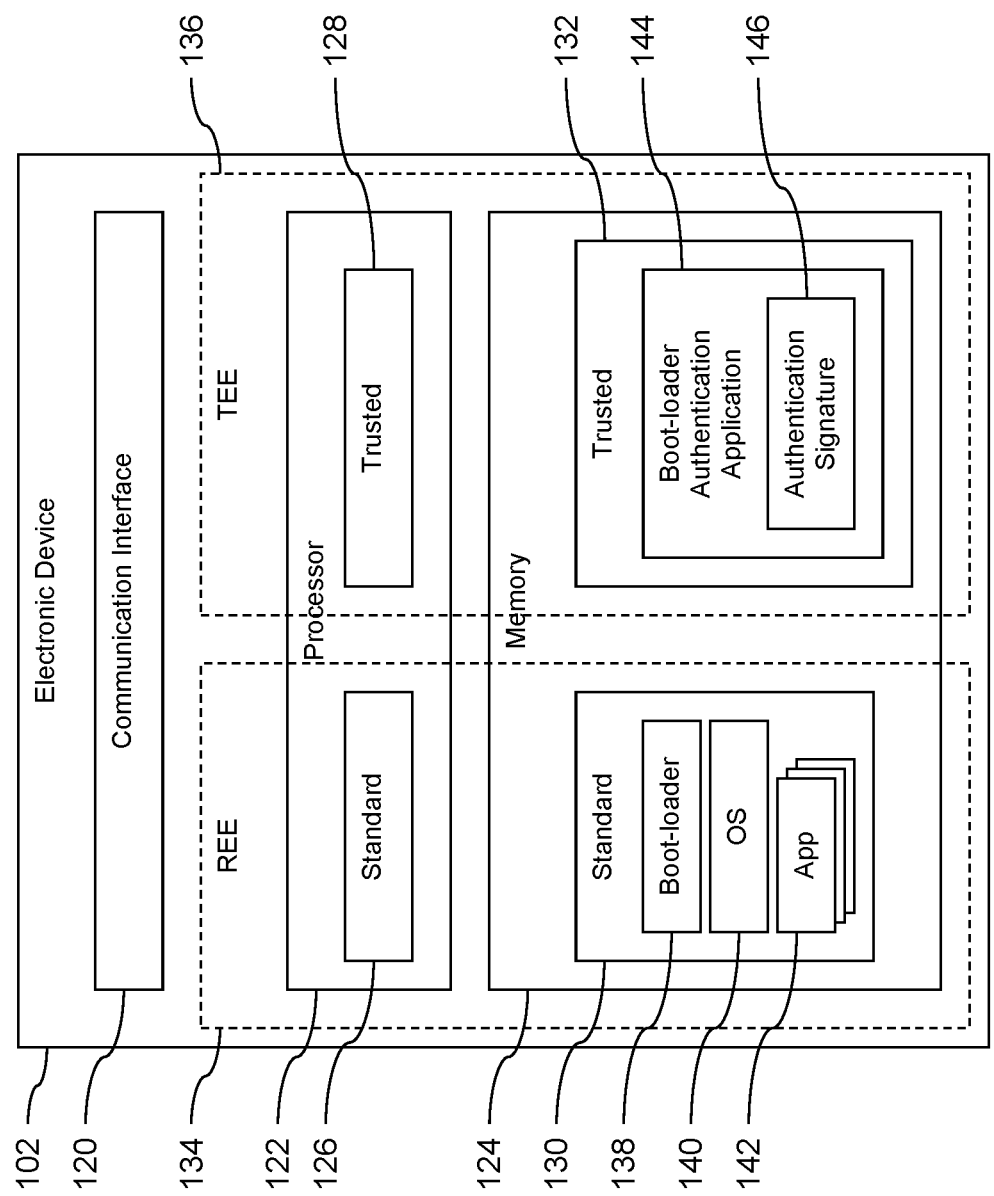
FIG. 2 is a block diagram of an electronic device according to an embodiment of the disclosure.

Turning now to FIG. 2, further details of the electronic devices 102 are described. In an embodiment, the electronic devices 102 comprise one or more communication interfaces 120, a processor 122, and a memory 124. The processor 122 may comprise a standard processor portion 126 and a trusted processor portion 128. The memory 124 may comprise a standard memory portion 130 and a trusted memory portion 132. The standard processor portion 126 and the standard memory portion 130 may be deemed a rich execution environment (REE) 134, and the trusted processor portion 128 and the trusted memory portion 132 may be deemed a trusted execution environment (TEE) 136.

The standard memory portion 130 may comprise a boot-loader 138, an OS 140, and one or more applications 142. The boot-loader 138, the OS 140, and the applications 142 may be stored in a non-volatile portion of the standard memory portion 130. The trusted memory portion 132 may comprise a boot-loader authentication application 144, and the boot-loader authentication application 144 may comprise one or more authentication signatures 146. Alternatively, the one or more authentication signatures 146 may be stored outside of the boot-loader authentication application 144 but still within the trusted memory portion 132. The boot-loader authentication application 144 and the one or more authentication signatures 146 may be stored in a non-volatile portion of the trusted memory portion 132.

The authentication signature 146 may be determined at the time of manufacture of the electronic device 102 and stored in the trusted memory portion 132 or built into the boot-loader authentication application 144 before the electronic device 102 is shipped. The authentication signature 146 may be updated at a time after manufacture, for example at the time of an over-the-air firmware upgrade. The authentication signature 146 may be conveyed to the TEE 136 and/or the boot-loader authentication application 144 for storing in the trusted memory portion 132 by the boot-loader authentication server application 110, for example via a trusted end-to-end communication link between the TEE 136 and the boot-loader authentication server application 110. For further details about trusted end-to-end communication see U.S. Pat. No. 9,282,898, filed Jun. 25, 2012, entitled "End-to-end Trusted Communications Infrastructure," by Leo Michael McRoberts, et al., which was incorporated by reference further above.

In an embodiment, when the electronic device 102 is powered on, the TEE 136 is booted and becomes operational before the REE 134 is booted. The boot-loader authentication application 144 can execute in the TEE 136 while the REE 135 remains un-booted and dormant, checking to see if the boot-loader 138 and/or if the OS 140 have been modified from an authorized form. If the boot-loader authentication application 144 determines the boot-loader 138 and the OS 140 are unmodified, it may deem the boot-loader 138 and the OS 140 to be authenticated. If the boot-loader authentication application 144 determines that the boot-loader 138 or the OS 140 have been altered, the boot-loader authentication application 144 may deem the boot-loader 138 and/or the OS 140 to be unauthorized and take appropriate action.

The boot-loader authentication application 144 may authenticate the boot-loader 138 and/or the OS 140 in a variety of different ways. In an embodiment, the boot-loader authentication application 144 may read each instruction in the boot-loader 138 and determine an electronic signature that uniquely or quasi-uniquely represents the contents of the boot-loader 138. For example, the boot-loader authentication application 144 may calculate a cyclic redundancy check (CRC) value over the boot-loader 138. For example, the boot-loader authentication application 144 may calculate a hash over the boot-loader 138. The boot-loader authentication application 144 can compare the electronic signature of the boot-loader 138 that it determines to be the authentication signature 146. If the determined electronic signature matches the authentication signature 146, the boot-loader authentication application 144 may deem the boot-loader 138 authenticated. If the two signatures differ, however, the boot-loader authentication application 144 deems the boot-loader 138 unauthenticated, indicating that the boot-loader 138 has been changed in some way.

In a like manner, the boot-loader authentication application 144 may read instructions of the OS 140 or portions of the OS 140 and determine an electronic signature of the OS 140 or portions of the OS 140. By comparing this electronic signature to the stored authentication signature 146, the boot-loader authentication application 144 can determine if the OS 140 or portions of the OS 140 are authenticated or are unauthenticated. In an embodiment, the boot-loader authentication application 144 may read only instructions that comprise a kernel portion of the OS 140 and determine a kernel signature that it compares to a stored kernel authentication signature. In an embodiment, the authentication signature 146 comprises a plurality of electronic signatures, for example an authentication signature 146 of the boot-loader 138, an authentication signature 146 of a kernel of the OS 140, and one or more authentication signatures 146 of one or more other portions of the OS 140.

When the boot-loader authentication application 144 determines the boot-loader 138 is unauthorized, it may prevent the boot-loader 138 from executing. The boot-loader authentication application 144 may rewrite an authorized version of the boot-loader 138 in the standard memory portion 130 and then allow the boot-loader 138 to execute. The boot-loader authentication application 144 may allow the boot-loader 138 to execute but may change the contents of some values in the standard memory portion 130 after the boot-loader 138 has completed execution, for example resetting some configuration parameters to authorized values. The boot-loader authentication application 144 may allow the boot-loader 138 to execute but may send a message reporting the event of the boot-loader 138 failing to pass authentication to an enterprise having a proprietary interest in the electronic device 102, for example to the boot-loader authentication server 108. When the boot-loader authentication application 144 determines that at least a portion of the OS 140 is unauthorized, it may take actions similar to those taken for an unauthorized boot-loader 138 application.

Figure 3:
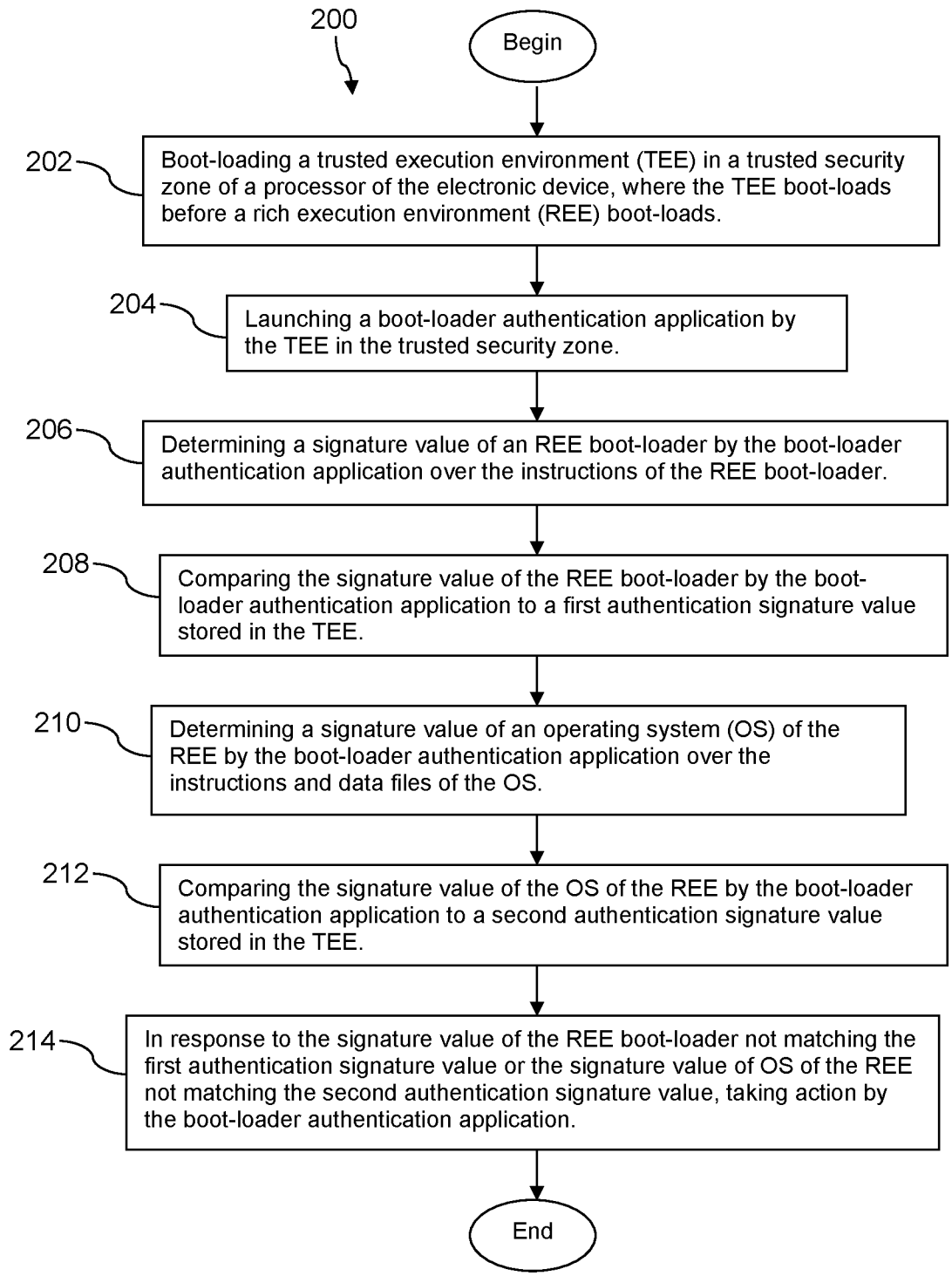
FIG. 3 is a flow chart of a method according to an embodiment of the disclosure.

Turning now to FIG. 3, a method 200 is described. In an embodiment, the method 200 is a method of boot-loading an electronic device. In an embodiment, the method 200 is a method of authenticating a boot-loader stored in an electronic device. In an embodiment, the method 200 is a method of authenticating a boot-loader and at least a portion of an operating system stored in an electronic device, for example authentication of a kernel portion of an operating system.

At block 202, the method 200 comprises boot-loading a trusted execution environment (TEE) in a trusted security zone of a processor of the electronic device, where the TEE boot-loads before a rich execution environment (REE) boot-loads. At block 204, the method 200 comprises launching a boot-loader authentication application by the TEE in the trusted security zone.

At block 206, the method 200 comprises determining a signature value of an REE boot-loader by the boot-loader authentication application over the instructions of the REE boot-loader. At block 208, the method 200 comprises comparing the signature value of the REE boot-loader by the boot-loader authentication application to a first authentication signature value stored in the TEE.

At block 210, the method 200 comprises determining a signature value of an operating system (OS) of the REE by the boot-loader authentication application over the instructions and data files of the OS. At block 212, the method 200 comprises comparing the signature value of the OS of the REE by the boot-loader authentication application to a second authentication signature value stored in the TEE. At block 214, the method 200 comprises, in response to the signature value of the REE boot-loader not matching the first authentication signature value or the signature value of OS of the REE not matching the second authentication signature value, taking action by the boot-loader authentication application.

Figure 4:
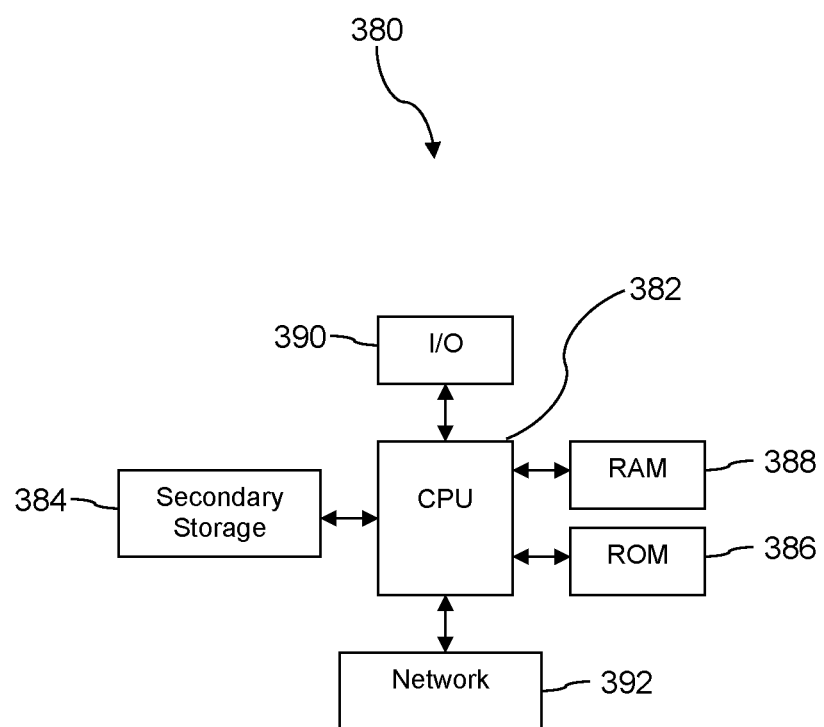
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of.

During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of boot-loading electronic devices, comprising:
   commanding, by a boot-loader authentication server application, a plurality of electronic devices to perform boot-load authentication;
   performing the boot-load authentication by each electronic device of the plurality of electronic devices responsive to the commanding, wherein performing the boot-load authentication comprises:
      boot-loading a trusted execution environment (TEE) in a trusted security zone of a processor of the electronic device, where the TEE boot-loads before a rich execution environment (REE) boot-loads;
      launching a boot-loader authentication application by the TEE in the trusted security zone;
      calculating a hash value of the REE boot-loader by analyzing instructions of the REE boot-loader one at a time, the hash value determined according to individual hashes of each analyzed instruction of the REE boot-loader;
      comparing the hash value of the REE boot-loader by the boot-loader authentication application to a reference hash value of the REE boot-loader stored in the TEE; and
      reporting results of the comparison by the boot-loader authentication application to the boot-loader authentication server application;
   determining, by the boot-loader authentication server application, that more than a threshold amount of the plurality of electronic devices failed the boot-load authentication based on the results; and
   taking action by the boot-loader authentication server application in response to determining that more than the threshold amount of the plurality of electronic devices failed the boot-loader authentication.

2. The method of claim 1, wherein taking action by the boot-loader authentication server application comprises increasing a frequency of commanding execution of the boot-loader authentication application on at least a subset of the plurality of electronic devices.

3. The method of claim 1, wherein performing the boot-load authentication further comprises in response to the hash value of the REE boot-loader not matching the reference hash value, taking action by the boot-loader authentication application.

4. The method of claim 3, wherein taking action comprises the boot-loader authentication application preventing the REE boot-loader from executing on the electronic device.

5. The method of claim 3, wherein taking action comprises the boot-loader authentication application overwriting the boot-loader in the REE with a trusted boot-loader.

6. The method of claim 1, wherein the electronic device is an Internet of things (IoT) device.

7. The method of claim 1, wherein performing the boot-load authentication further comprises:
   determining a signature value of a REE operating system kernel by the boot-loader authentication application; and
   comparing the signature value of the REE operating system kernel to an authorization kernel signature value stored in the TEE portion of the non-transitory memory by the boot-loader authentication application.

8. A system comprising, comprising:
   an electronic device that comprises:
      a processor comprising a trusted execution environment (TEE) and a rich execution environment (REE);
      a non-transitory memory;
      an REE boot-loader stored in an REE portion of the non-transitory memory that, when executed in the REE of the processor, boot-loads the REE; and
      a boot-loader authentication application stored in a TEE portion of the non-transitory memory that, when executed in the TEE of the processor:
         calculates a hash value of the REE boot-loader by analyzing instructions of the REE boot-loader one at a time, the hash value determined according to individual hashes of each analyzed instruction of the REE boot-loader,
         compares the hash value of the REE boot-loader to a reference hash value of the REE boot-loader stored in the TEE portion of the non-transitory memory, and reports results of the comparison to a boot-loader authentication server application; and a boot-loader authentication server that comprises:
   a processor;
   a non-transitory memory; and
   the boot-loader authentication server application stored in the non-transitory memory that, when executed by the processor:
      commands a plurality of electronic devices including the electronic device to perform boot-load authentication,
      determines that more than a threshold amount of the plurality of electronic devices failed the boot-load authentication based on results received from the plurality of electronic devices including the results from the electronic device, and
      takes action in response to determining that more than the threshold amount of the plurality of electronic devices failed the boot-loader authentication.

9. The system of claim 8, wherein the boot-loader authentication application takes action in response to the hash value of the REE boot-loader not matching the reference hash value.

10. The system of claim 8, wherein the electronic device is an Internet of things (loT) device.

11. The system of claim 8, wherein the electronic device is one of a mobile phone, a smart phone, a wearable computer, a laptop computer, a tablet computer, or a notebook computer.

12. The system of claim 8, wherein the boot-loader authentication application determines the hash value of the REE boot-loader as a cyclic redundancy check (CRC) value.

13. The system of claim 8, wherein the boot-loader authentication application further determines a signature value of a REE operating system kernel and compares the signature value of the REE operating system kernel to an authorization kernel signature value stored in the TEE portion of the non-transitory memory.

14. The system of claim 8, wherein the REE boot-loader is not executed in the REE until the boot-loader authentication application has completed execution.

15. A method of boot-loading an electronic device, comprising:

receiving, by an electronic device, a first command to perform boot-load authentication from a boot-loader authentication server application;

in response to the first command, boot-loading a trusted execution environment (TEE) in a trusted security zone of a processor of the electronic device, where the TEE boot-loads before a rich execution environment (REE) boot-loads;

launching a boot-loader authentication application by the TEE in the trusted security zone;

calculating a hash value of the REE boot-loader by analyzing instructions of the REE boot-loader one at a time, the hash value determined according to individual hashes of each analyzed instruction of the REE boot-loader;

comparing the hash value of the REE boot-loader to a reference hash value of the REE boot-loader stored in the TEE;

sending results from the comparison by the boot-loader authentication application to the boot-loader authentication server application; and subsequently receiving, by the electronic device, a second command to perform the boot-loader authentication from the boot-loader authentication server application, wherein the second command is sent by the boot-loader authentication server application in response to determining that more than a threshold amount of a plurality of electronic devices failed the boot-load authentication.

16. The method of claim 15, further comprising in response to the hash value of the REE boot-loader not matching the reference hash value, taking action by the boot-loader authentication application.

17. The method of claim 16, wherein taking action comprises the boot-loader authentication application preventing the REE boot-loader from executing on the electronic device.

18. The method of claim 15, wherein the results indicate a boot-loader authentication failure event.

19. The method of claim 15, wherein the electronic device is an Internet of things (loT) device.

20. The method of claim 15, wherein the boot-loader authentication application determines the hash value as a cyclic redundancy check (CRC) value calculated over the instructions of the REE boot-loader.

* * * * *